United States Patent
Ng et al.

(10) Patent No.: US 10,298,416 B2
(45) Date of Patent: May 21, 2019

(54) METHOD AND SYSTEM FOR CONVERTING A BROADCAST PACKET TO A UNICAST PACKET AT AN ACCESS POINT

(71) Applicant: Pismo Labs Technology Limited, Hong Kong (HK)

(72) Inventors: Kam Chiu Ng, Hong Kong (HK); Yu Yeung, Hong Kong (HK); Ka Kei Liu, Hong Kong (HK)

(73) Assignee: PISMO LABS TECHNOLOGY LIMITED, Hong Kong (HK)

( * ) Notice: Subject to any disclaimer, the term of this patent is extended or adjusted under 35 U.S.C. 154(b) by 82 days.

(21) Appl. No.: 15/357,111

(22) Filed: Nov. 21, 2016

(65) Prior Publication Data

US 2017/0070428 A1    Mar. 9, 2017

Related U.S. Application Data (63) Continuation of application No. 14/003,236, filed on Sep. 5, 2013, now Pat. No. 9,503,276.

(51) Int. Cl.
*H04L 12/721* (2013.01)
*H04L 12/46* (2006.01)
(Continued)

(52) U.S. Cl.
CPC .......... *H04L 12/4641* (2013.01); *H04L 12/18* (2013.01); *H04L 12/1886* (2013.01);
(Continued)

(58) Field of Classification Search
CPC ............. H04L 12/4633; H04L 12/4641; H04L 12/6418; H04L 45/30; H04L 45/66;
(Continued)

(56) References Cited

U.S. PATENT DOCUMENTS 6,963,575 B1    11/2005  Sistanizadeh
7,478,173 B1*   1/2009   Delco ................ H04L 12/2865
                                                       709/250

(Continued)

FOREIGN PATENT DOCUMENTS

CN      1964345 A     5/2007
CN    101601232 A    12/2009
(Continued)

OTHER PUBLICATIONS

International Search Report in International Application No. PCT/IB2012/057201, dated Sep. 5, 2013.
(Continued)

*Primary Examiner* — Zhiren Qin
(74) *Attorney, Agent, or Firm* — Hershkovitz & Associates, PLLC; Abe Hershkovitz (57) ABSTRACT

The present invention discloses a method and system for processing a first layer two packet converting a first layer two packet to a first unicast layer two packet at a wireless access point. The wireless access point receives first one or more layer three packets and extracts a first layer two packet from the first one or more layer three packets. If the first layer 2 packet is a multicast packet and it satisfies the predefined rule, the first layer two packet is converted to a layer two unicast packet with a first destination address and send to a Local Area Network (LAN) network interface. If the first layer two packet does not satisfy the predefined rule, it is broadcast to one or more LAN network interface. When the first layer two packet is not a multicast packet, it is sent to its corresponding destination address through one or more LAN network.

20 Claims, 7 Drawing Sheets

(51) Int. Cl.
  *H04L 12/931* (2013.01)
  *H04L 12/18* (2006.01)
  *H04L 29/06* (2006.01)
  *H04L 29/08* (2006.01)
  *H04L 29/12* (2006.01)

(52) U.S. Cl.
  CPC .......... *H04L 49/201* (2013.01); *H04L 61/103* (2013.01); *H04L 69/08* (2013.01); *H04L 69/22* (2013.01); *H04L 69/324* (2013.01); *H04L 69/325* (2013.01); *H04L 61/2015* (2013.01); *H04L 61/6009* (2013.01); *H04L 61/6022* (2013.01); *H04L 69/16* (2013.01); *H04L 2212/00* (2013.01)

(58) Field of Classification Search
  CPC .......... H04L 49/201; G06K 2009/3225; G06K 2009/363; G06K 9/3233; G06T 3/20; G06T 5/006; H04N 9/3185; H04N 9/3194
  USPC ........................................... 370/392
  See application file for complete search history.

(56) References Cited

U.S. PATENT DOCUMENTS

| | | | |
|---|---|---|---|
| 8,259,720 B2 | 9/2012 | Farinacci | |
| 2002/0191612 A1 | 12/2002 | Curtis | |
| 2002/0194367 A1 | 12/2002 | Nakamura | |
| 2004/0019876 A1 | 1/2004 | Dravida | |
| 2004/0042487 A1 | 3/2004 | Ossman | |
| 2004/0111640 A1 | 6/2004 | Baum | |
| 2005/0207414 A1* | 9/2005 | Duvvury | H04L 29/12292 370/389 |
| 2005/0223111 A1* | 10/2005 | Bhandaru | H04L 12/4604 709/236 |
| 2005/0265309 A1* | 12/2005 | Parandekar | H04L 12/2801 370/351 |
| 2006/0168270 A1 | 7/2006 | Townsley | |
| 2006/0203721 A1 | 9/2006 | Hsieh | |
| 2007/0153741 A1* | 7/2007 | Blanchette | H04L 45/66 370/331 |
| 2007/0162619 A1 | 7/2007 | Aloni | |
| 2007/0183418 A1 | 8/2007 | Riddoch | |
| 2007/0223494 A1* | 9/2007 | Hyyrynen | H04L 12/66 370/395.54 |
| 2007/0248085 A1 | 10/2007 | Volpano | |
| 2008/0020758 A1 | 1/2008 | Nagarajan et al. | |
| 2008/0056247 A1* | 3/2008 | Chang | H04L 12/40 370/389 |
| 2008/0165781 A1 | 7/2008 | Voit | |
| 2008/0186968 A1 | 8/2008 | Farinacci et al. | |
| 2009/0034431 A1 | 2/2009 | Nagarajan | |
| 2009/0037607 A1* | 2/2009 | Farinacci | H04L 12/4641 709/249 |
| 2009/0129382 A1 | 5/2009 | Elias | |
| 2009/0154471 A1* | 6/2009 | Kim | H04L 12/2856 370/395.53 |
| 2009/0213859 A1 | 8/2009 | De Silva | |
| 2010/0118882 A1* | 5/2010 | Gao | H04L 12/4633 370/411 |
| 2010/0135297 A1* | 6/2010 | Brousard | H04L 12/18 370/390 |
| 2010/0329265 A1 | 12/2010 | Lapuh | |
| 2011/0004913 A1 | 1/2011 | Nagarajan | |
| 2011/0019673 A1* | 1/2011 | Fernandez Gutierrez | H04L 12/185 370/390 |
| 2011/0051689 A1 | 3/2011 | Premec | |
| 2011/0202920 A1 | 8/2011 | Takase | |
| 2011/0283013 A1 | 11/2011 | Grosser et al. | |
| 2011/0286462 A1* | 11/2011 | Kompella | H04L 45/18 370/395.53 |
| 2012/0014386 A1 | 1/2012 | Xiong | |
| 2012/0087356 A1 | 4/2012 | Wentink | |
| 2012/0089714 A1* | 4/2012 | Carley | H04L 69/28 709/223 |
| 2012/0207170 A1* | 8/2012 | Patel | H04L 12/4633 370/395.53 |
| 2013/0003601 A1* | 1/2013 | Gupta | H04L 12/462 370/254 |
| 2013/0061034 A1 | 3/2013 | Walheim, Sr. | |
| 2013/0136123 A1 | 5/2013 | Ge | |
| 2013/0201979 A1* | 8/2013 | Iyer | H04W 84/12 370/338 |
| 2013/0276090 A1* | 10/2013 | Kopti | H04W 88/16 726/11 |
| 2013/0311637 A1* | 11/2013 | Kamath | H04L 29/08576 709/224 |
| 2014/0025790 A1 | 1/2014 | Robitaille | |
| 2014/0036754 A1* | 2/2014 | Narasimhan | H04W 4/08 370/312 |
| 2014/0195666 A1 | 7/2014 | Dumitriu et al. | |

FOREIGN PATENT DOCUMENTS

| | | |
|---|---|---|
| CN | 101605090 A | 12/2009 |
| CN | 102231701 A | 11/2011 |

OTHER PUBLICATIONS

Written Opinion of the International Searching Authority in International Application No. PCT/IB2012/057201, dated Sep. 5, 2013.
English language Abstract of CN 1964345 A (May 16, 2007).
English language Abstract of CN 101601232 A (Dec. 9, 2009).
English language Abstract of CN 101605090 A (Dec. 16, 2009).
English language Abstract of CN 102231701 A (Nov. 2, 2011).
Office Action in related Chinese Application No. 201280067636.7, dated Jun. 13, 2016.

* cited by examiner

METHOD AND SYSTEM FOR CONVERTING A BROADCAST PACKET TO A UNICAST PACKET AT AN ACCESS POINT

RELATED APPLICATIONS

The present application is a non-provisional continuation-in-part application which claims the benefits of and is based on application Ser. No. 14/003,236 titled "METHOD AND SYSTEM TO REDUCE WIRELESS NETWORK PACKETS FOR CENTRALISED LAYER TWO NETWORK" filed on 5 Sep. 2013. The contents of the above-referenced application are herein incorporated by reference.

TECHNICAL FIELD

This disclosure relates in general to the field of computer networks. More particularly, the present invention relates to a method and system for processing a first layer two packet converting a first layer two packet to a first unicast layer two packet at a wireless access point.

SUMMARY

Method and system for processing a first layer two packet converting a first layer two packet to a first unicast layer two packet at a wireless access point. The present invention discloses a method for processing a first layer two packet by converting a first layer two packet to a first unicast layer two packet at a wireless access point. The wireless access point receives first one or more layer three packets. Then a first layer two packet is extracted from the first one or more layer three packets. It needs to be determined whether the first layer 2 packet is a multicast packet. If the first layer 2 packet is a multicast packet and it satisfies the predefined rule then the first layer two packet is converted to a layer two unicast packet with a first destination address and send to a Local Area Network (LAN) network interface. If the first layer two packet does not satisfy the predefined rule, it is broadcast to one or more LAN network interface. When the first layer two packet is not a multicast packet, it is sent to its corresponding destination address through one or more LAN network.

According to one of the embodiments of the present invention, when the first layer two packet satisfies a first predefined rule, the wireless access point does not send the first layer two packet. According to one of the embodiments, the first one or more layer three packets are received through a virtual private network (VPN). The first one or more layer three packets may be received from a first wide area network (WAN) network interface. The first destination address is determined according to the one of the predefined formats.

According to one of the embodiments, the predefined rules are created by the manufacturer of the wireless access point, inputted manually, and retrieved from a server either locally or remotely. The first layer two packet encapsulates an Internet Protocol (IP) Address Resolution Protocol (ARP) packet. Alternatively, the first layer two packet encapsulates an IP Dynamic Host Configuration Protocol (DHCP) packet.

According to one of the embodiments, the determining whether the first layer two packet is a multicast packet is based on destination address of the determining whether the first layer two layer is a multicast packet. According to one of the embodiments, the first one or more layer three packets are received using User Data Protocol (UDP).

BACKGROUND ART

The use of wireless network communication systems that permit hosts to communicate via an optical cable, copper cable, or radio link has become widespread. Hosts are embedded with wireless communication electronics to communicate with other hosts and also to connect to a core network via access points, such as a local area network (LAN) and the Internet. The access point relays network packets between hosts and the core network, and also among hosts.

Hosts and base stations using Open Systems Interconnection (OSI) layer two technologies, such as Ethernet, to communicate with the core network and each other are less efficient at handling broadcast and multicast network packets. One kind of broadcast network packets on Internet Protocol (IP) networks belongs to Address Resolution Protocol (ARP) protocol network packets. For multicast network packets, the Internet Group Management Protocol (IGMP) is one of many communications protocol used by hosts and adjacent routers to establish multicast group memberships.

Due to historical technology development, hosts that belong to the same layer two networks are usually close together and share the same communication channel or the cost of communications with each other is low. Therefore, broadcast and multicast packets in layer two networks have not been a significant concern. When a layer two network is formed through layer three networks, broadcast and multicast packets in the layer two networks may become a concern as the amount of packets increases. ARP proxy, proxy server, LAN segmentation, caching are common methods to reduce layer two broadcast and multicast packets.

When layer two packets are encapsulated in layer three packets, for example through Layer Two Tunnelling Protocol (L2TP) and virtual private network (VPN), the amount of broadcast and multicast packets could have a severe negative impact on layer three network performance. Furthermore, when radio spectrum is used to transmit the layer three packets, there may not be enough capacity to transit the broadcast and multicast packets.

Prior arts ARP proxy, proxy server, LAN segmentation, caching and other broadcast and multicast packets reduction techniques do not allow transmission of broadcast and multicast packets selectively and particularly broadcast and multicast packets originated from a mobile network device through layer three networks.

U.S. Pat. No. 7,356,032 discloses a system and method for reducing broadcast packets among mobile units by using a cache to store Ethernet/IP address pairs in each base station. However, U.S. Pat. No. 7,356,032 cannot reduce broadcast packets if the mobile units are connecting to the core network using OSI layer two protocol through layer three networks. Also U.S. Pat. No. 7,356,032 relies on wireless access point to manage ARP packets. This also increases the complexity of the design of wireless access point.

Figure 1:
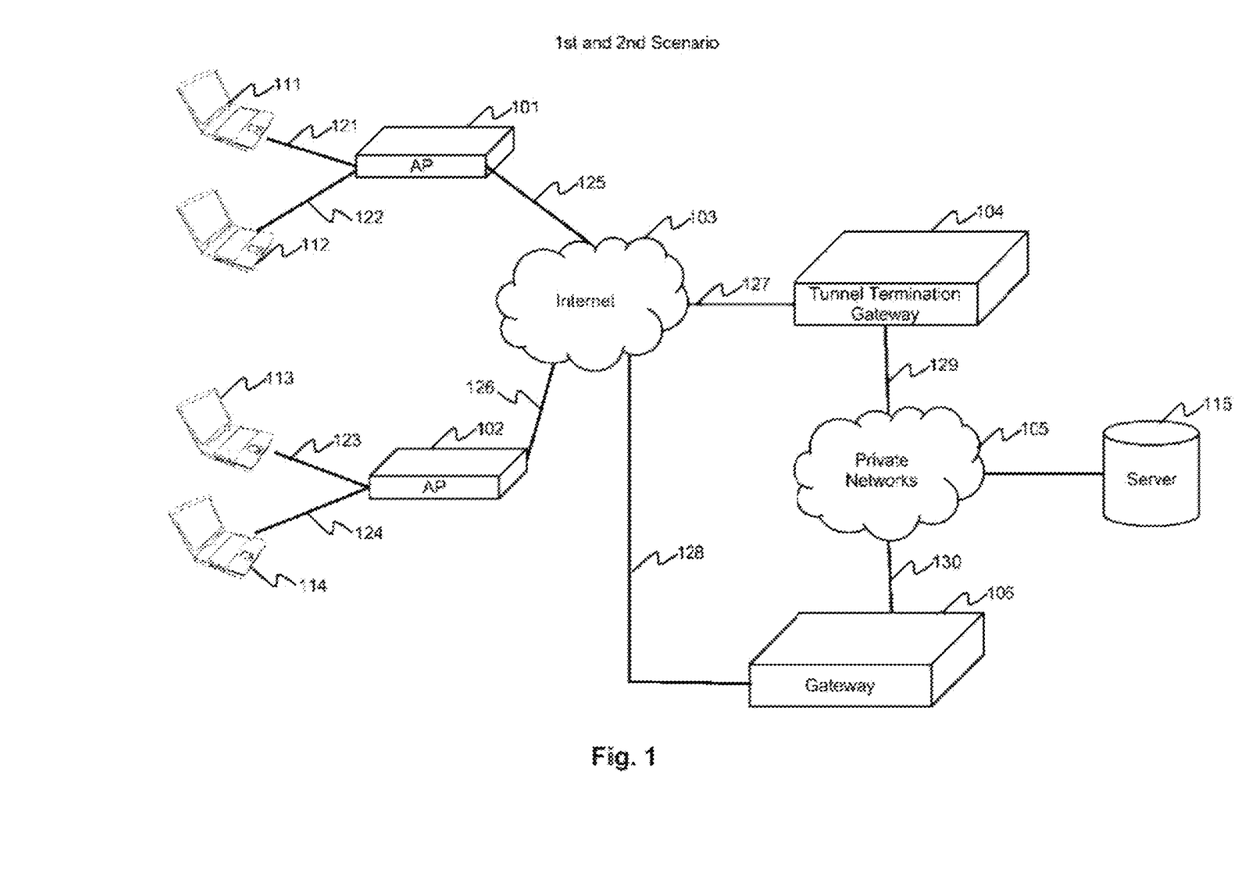
FIG. 1 illustrates a network environment where communication systems and hosts, such as client computers 111, 112, 113 and 114 communicate to wide area networks (WANs) or the Internet directly.

FIG. 1 illustrates a network environment where communication systems and hosts, such as client computers 111, 112, 113 and 114, communicate to wide area networks (WANs) or the Internet directly. In this particular network environment, those skilled in the art would appreciate that when client computer 111 sends OSI layer three packets to the Internet through the following steps: first, client computer 111 sends OSI layer three packets to wireless access point (AP) 101 (Computer Layer Two Packets) through radio link 121, wherein the layer two packets, encapsulate layer three packets from computer 111 (Computer Layer Three Packets); secondly, AP 101 communicates with Tunnel Termination Gateway 104 through interconnected, networks, such as Internet 103, by using layer three packets (AP Layer Three Packets) to encapsulate Computer Layer Two Packets; thirdly, Tunnel Termination Gateway 104 decapsulates AP Layer Three Packets to retrieve Computer Layer Two Packets and sends Computer Layer Two Packets to Internet Gateway 106 through private networks 105; finally, Internet Gateway 106 decapsulates Computer Layer Two Packets to retrieve Computer Layer Three Packets and sends Computer Layer Three Packets to Internet 103.

When there are OSI layer three packets for client computer 111 from Internet 103: first, Internet Gateway 106 receives the layer three packets (Internet Packets) from Internet 103 and sends the Internet Packet to Tunnel Termination Gateway 104 by encapsulating Internet Packet in layer two packets (Gateway Layer Two Packets); secondly, Tunnel Termination Gateway 104 encapsulates Gateway Layer Two Packets in layer three packets (Tunneled Layer Three Packets) and sends Tunneled Layer Three Packets to AP 101 through Internet 103; thirdly AP 101 decapsulates Tunnelled Layer Three Packets to retrieve Gateway Layer Two Packets and sends Gateway Layer Two Packets to client computer 111 through radio link 121; finally client computer 111 retrieves Internet Packets by decapsulating Internet Packets from Gateway Layer Two Packets.

AP 101 and Tunnel Termination Gateway 104 are connected through a layer two tunnel by using layer three packets. The layer two tunnel may be implemented by using L2TP or other tunnelling protocols. Myriad other combinations and permutations of how to establish a layer two tunnel between two communication systems using layer three packets would be appreciated by those of ordinary skill given the present disclosure.

The steps of communicating with Internet 103 by client computer 112 are similar to the steps of communicating with Internet 103 by client computer 111. The same steps are applied to computing devices 113 and 114, however instead of using AP 101, AP 102 is used. It is apparent to a skilled person in the art how the steps of communicating with Internet 103 also apply to hosts, client computers, computing devices and communication systems through wireless access points. Tunnel Termination Gateway 104, private networks 105 and Internet Gateway 106.

It may be noted that server 115 and client computers 111, 112, 113 and 114 all belong to the same layer two network as they are connected through layer three networks between AP 101 and Tunnel Termination Gateway 104 and between AP 102 and Tunnel Termination Gateway 104. Therefore, when server 115 sends a layer two broadcast or multicast packet, the broadcast or multicast packet is then duplicated by Tunnel Termination Gateway 104, AP 101 and AP 102 and sent to client computers 111, 112, 113 and 114. This type of broadcast or multicast network packets may easily consume a significant part of network resources between AP 101 and Internet 103, between AP 102 and Internet 103, between Tunnel Termination Gateway 104 and Internet 103, radio spectrum of AP 101 and radio spectrum AP 102. This invention aims to reduce broadcast and multicast network packets in the network environment just described.

DISCLOSURE OF INVENTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It is understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in the figure. A process may refer to a method, a function, a procedure, a subroutine, a subprogram, etc. When a process corresponds to a function, its termination corresponds to a return of the function to the calling function or the main function.

Moreover, as disclosed herein, the term "computer storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as computer storage medium. A processing unit(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

A network interface, such as LAN interface and WAN interface, that may be provided by the communication system (CS) is an Ethernet interface, a frame relay interface, an antenna interface, a fibre optic interface, a cable interface, a DSL interface, a token ring interface, a serial bus interface, an universal serial bus (USB) interface, Firewire interface, Peripheral Component Interconnect (PCI) interface, etc. In one variant, a network interface is in a processing unit and therefore the agent for connecting with optical fiber, cables or antenna may directly connect with the processing unit. In one variant, a network interface may connect to a Wi-Fi adapter for Wi-Fi network connection. In one variant, a network interface may connect to a USB port and the USB port may connect to an external modem for wireless WAN connection, such as a USB 3G modem, USB LTE modem, USB WiMAX Modem, USB Wi-Fi Modem, or other modem for wireless communications. Myriad other combinations and permutations of the foregoing will be appreciated by those of ordinary skill given the present disclosure.

In order to improve readability, Open Systems Interconnection (OSI) layer two is interchangeable in this present invention with layer two and similarly OSI layer three is interchangeable with layer two.

A base station, interchangeable in this present invention with access point, is a radio receiver/transmitter that serves as the hub of the local wireless network, and may also be the gateway between a wired network and the wireless network. It may consist of a transmitter and wireless router.

A host is an electronic device, such as a mobile phone, computer, server, router, switch, sensor and etc, connected to a computer network. A host may offer information resources, services, and applications to users or other nodes on the network. A host is a network node that is assigned a network layer host address. Hosts may have one or more Internet Protocol (IP) addresses assigned to their network interfaces. The addresses are configured either manually by an administrator, automatically at start-up by means of the Dynamic Host Configuration Protocol (DHCP), or by stateless address auto-configuration methods.

A pre-defined layer two broadcast destination address is an address known to the CS as a broadcast address, including Ethernet broadcast address FF:FF:FF:FF:FF:FF in hexadecimal, an address used by CS manufacturer for proprietary broadcasting and an address configured by the administrator of the CS manufacturer for proprietary broadcasting. A multicast destination address is an address known to the CS as a multicast address, including multicast address learnt by the CS through IGMP.

A CS is a host capable of establishing and terminating at least one layer two tunnel, such as a VPN established by using L2TP, receiving layer two packets, and sending layer two packets. As the CS has to be able to establish and terminate at least one layer two tunnel, the CS has to able to receive and send layer three packets. The CS may communicate to other hosts through wireless and/or wired networks. The CS may be an 802.11 access point capable of handling IEEE 802.11 protocol. The CS may be an Internet Protocol (IP) router. The CS may be an IP router with Ethernet switch capability. The CS may be a host capable of communicating with other hosts using one or more OSI layer two protocols, such as Ethernet, High-Speed Packet Access (HSPA), HSPA+, Long Term Evolution (LTE), WiMax, GPRS, EDGE, GSM, CDMA, WiFi, CDMA2000, WCDMA, TD-SCDMA, BLUETOOTH, and WiBRO.

Figure 2:
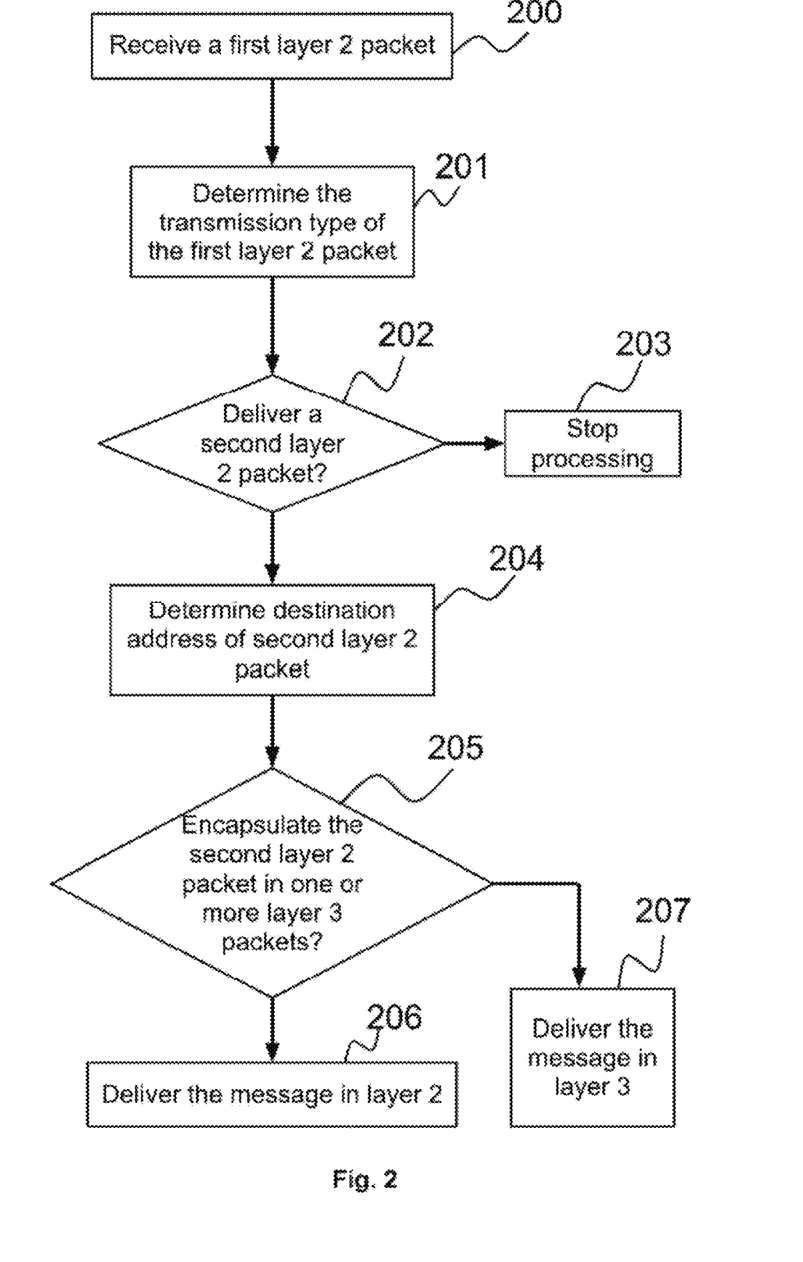
FIG. 2 is a flow chart illustrating how communication system reduces broadcast and multicast packets according to one of the embodiments of the present invention.

FIG. 2 is a flow chart illustrating how communication system reduces broadcast and multicast packets according to one of the embodiments of the present invention. When a communication system (CS) receives a layer two packet (Received L2 Packet) at step 200 through a network connection, which may be implemented by different network connection technologies, including wireless, wire and optical fiber, the CS determines whether transmission type of the Received L2 Packet is broadcast, multicast or unicast at step 201. According to one of the embodiments of present invention, the CS determines the transmission type by checking the destination address of the Received L2 Packet. In Ethernet network, media access control address (MAC address) the multicast and broadcast addresses are FF:FF:FF:FF:FF:FF in hexadecimal. As it is possible that the Received L2 Packet is encapsulated in one or more layer three packets (Received L3 Packets), the CS may need to decapsulate the Received L3 Packet to retrieve Received L2 Packet at step 201. Hosts communicating with each other using IP may use IGMP to determine the multicast address.

CS determines whether to send another layer two packet (CSL2 Packet) at step 202. According to one of the embodiments of present invention. CS sends CSL2 Packet if transmission type of Received L2 Packet is unicast. According to one of the embodiments of present invention, CS does not send CSL2 Packet if transmission type of Received L2 Packet is broadcast or multicast. According to one of the embodiments of present invention, CS sends a broadcast or multicast CSL2 Packet if transmission type of Received L2 Packet is unicast and the destination address of the Received L2 Packet is a pre-determined address. According to one of the embodiments of present invention, CS sends a broadcast CSL2 Packet if transmission type of Received L2 Packet is unicast and the Received L3 Packets is received at a pre-defined port. According to one of the embodiments of present invention, the decision whether to send CSL2 Packet is based on one or more pre-defined rules (Pre-defined Rules).

CSL2 Packet is based on the Received L2 Packet. The content carried by the CSL2 Packet is from the content carried by the Received L2 Packet.

The destination address of CSL2 Packet is determined at step 204. According to one of the embodiments of present invention, when the transmission type of CSL2 Packet is broadcast, the destination address is a broadcast address, such as FF:FF:FF:FF:FF:FF used in Ethernet. When the transmission type of CSL2 Packet is unicast, the destination address is the layer two address of the receiver of CSL2 packet, such as a Media Access Control (MAC) address of the receiver of CSL2 Packet in Ethernet protocol. According to one of the embodiments of present invention, the destination address is determined according to Pre-defined Rules.

The number of combinations of the pre-defined rules may be numerous. Network administrators and/or communication system manufacturers may configure the predefined rules according to their needs and network environments.

Pre-defined Rules may be inputted to the CS manually by the CS administrator, retrieved from a server either locally or remotely or pre determined by the manufacturer of the CS. The Pre-defined Rules are stored in a machine-readable medium which may be implemented in the CS or another device.

Scenarios

The implementations consider at least the next eight scenarios. The first four scenarios are associated with the CS implementing the present invention being Tunnel Termination Gateway 104 which is connected to private networks 105 and Internet 103. Tunnel Termination Gateway 104 may be implemented by using a router, a server, a switch or any communication system that is capable of terminating layer two tunnel. Tunnel Termination Gateway 104 decides whether to send CSL2 Packet and determines the destination address according to the following four scenarios and may be implemented in Pre-defined Rules.

The second four scenarios are associated with the CS implementing the present invention being an AP, such as AP 101 and AP 102, and connected to hosts such as computing devices 111, 112, 113 and 114 and Internet 103, AP 101 and AP 102 may also be implemented by using a router, a server, a switch or any communication system that is capable of communicating wirelessly and terminating layer two tunnel, AP 101 or AP 102 decides whether to send CSL2 Packet and determines the destination address according to the next four scenarios and may be implemented according to a set of Pre-defined Rules.

The first scenario is that the Received L2 Packet is received by Tunnel Termination Gateway 104 through Internet 103 with a pre defined layer two broadcast destination address or a multicast destination address. According to one of the embodiments of present invention, as the destination address of Received L2 Packet is a pre-defined broadcast or multicast destination address; Tunnel Termination Gateway 104 determines whether the Received L2 Packet is intended for broadcast or multicast to private networks 105. Therefore, Tunnel Termination Gateway 104 decides that a CSL2 Packet is to be sent with broadcast transmission type or multicast transmission type to the private network at step 202 and the destination address is a broadcast or multicast layer two address at step 204. The pre-defined layer two broadcast destination or multicast address of the Received L2 Packet may be any layer two address, such as FF:FF:FF:FF:FF:FF for Ethernet, as long as Tunnel Termination Gateway 104 is able to recognize the use of the specific layer two address is for broadcast or multicast purpose. When the Received L2 Packet is originated from one of the computing devices 111-114, the Received L2 Packet is the same as the Computer Layer Two Packet mentioned earlier.

Figure 3A:
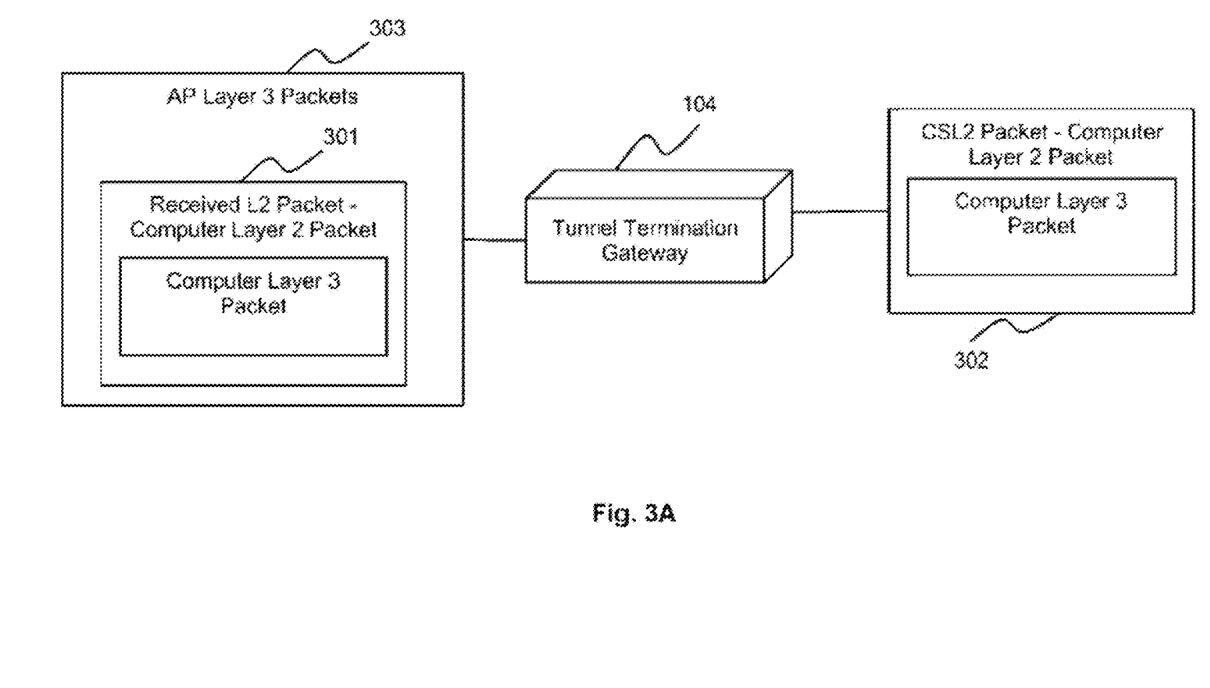
FIG. 3A illustrates the relationship among level 2 and level 3 packets received and sent by Tunnel Termination Gateway 104 when the Received L2 Packet 301 is sent by an AP and received by Tunnel Terminal Gateway 104.

FIG. 3A illustrates the relationship among level 2 and level 3 packets received and sent by Tunnel Termination Gateway 104 when the Received L2 Packet 301 is sent by an AP and received by Tunnel Terminal Gateway 104. Here, the Received L2 Packet 301 is a Computer Layer Two Packet, which encapsulates Computer Layer Three Packet and is encapsulated in AP Layer Three Packets 303. Computer Layer Three Packet is the layer three packet sent by a computing device, one of computing devices 111-114. Tunnel Termination Gateway 104 decapsulates AP Layer Three Packets 303 to retrieve Computer Layer Two Packet, which now becomes CSL2 Packet because Tunnel Termination Gateway 104 sends CSL2 Packet 302 to Private Networks 104. Computer Layer Three Packet remains encapsulated in the CSL2 Packet.

According to one of the embodiments of present invention, when the pie defined layer two broadcast or multicast destination address is the layer two address of Tunnel Termination Gateway 104, Tunnel Terminal Gateway 104 checks the port number of the Computer Layer Three Packet, which is encapsulated in the Received L2 Packet, to determine whether the Received L2 Packet is for broadcast or multicast purpose.

The second scenario is that the Received L2 Packet is received by Tunnel Termination Gateway 104 through Internet 103 with a non-pre-defined layer two broadcast or multicast destination address. According to one of the embodiments of present invention, as the destination address of Received L2 Packet is not a pre-defined broadcast or multicast destination address, Tunnel Termination Gateway 104 may determine that the Received L2 Packet is intended for unicast to a specific layer two address in the private networks 105. Therefore, Tunnel Termination Gateway 104 decides that a CSL2 Packet is to be sent with unicast transmission type to a device, such as Gateway 106 and Server 115, through private network at step 202 and the destination address is a unicast layer two address at step 204. When the Received L2 Packet is originated from one of the computing devices 111-114, the Received L2 Packet is the same as the Computer Layer Two Packets mentioned earlier.

It should be noted when Tunnel Termination Gateway 104 receives the Received L2 Packet through Internet 103, the Received L2 Packet is encapsulated in AP Layer Three Packets, Tunnel Termination Gateway 104 may decapsulate the AP Layer Three Packets to retrieve the Received L2 Packet. According to one of the embodiments of present invention, the decapsulation process is conducted by another communication system that terminates the layer two tunnels established with AP 101 and AP 102. In such case, the Received L2 Packet is received from that communication system.

Regardless of the transmission type of CSL2 Packet, when Tunnel Termination Gateway 104 sends CSL2 Packet through private networks 105, Tunnel Termination Gateway 104 need not encapsulate CSL2 Packet in one or more layer three packets at step 205 because private network 105 is a layer two network. Therefore, step 206 is then executed, instead of step 207.

The third scenario is that the Received L2 Packet is received by Tunnel Termination Gateway 104 through private network 105 with a pre defined layer two broadcast or multicast destination address. According to one of the embodiments of present invention, as the destination address of Received L2 Packet is a pre-defined broadcast or multicast destination address, Tunnel Termination Gateway 104 may determine that the Received L2 Packet is intended for broadcasting or multicasting to AP 101-102 and computing devices 111-114 through Internet 103. Therefore. Tunnel Termination Gateway 104 decides that no CSL2 Packet is sent at step 202 in order to reduce network packets and/or conserve wireless spectrum. The operation stops at step 203.

Figure 3B:
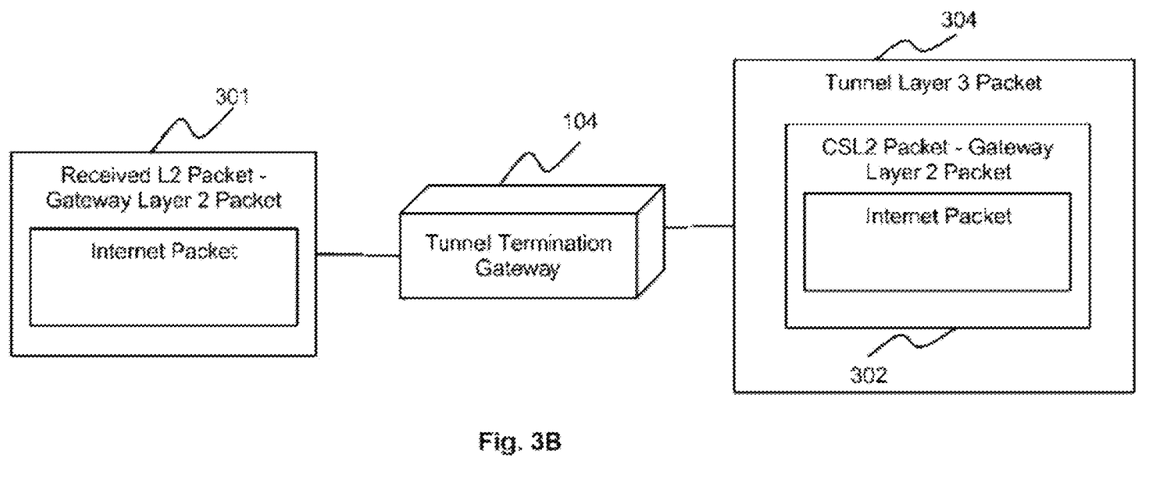
FIG. 3B illustrates the relationship among level 2 and level 3 packets received and sent by Tunnel Termination Gateway 104 when the Received L2 Packet 301 is received through Private Networks 104.

FIG. 3B illustrates the relationship among level 2 and level 3 packets received and sent by Tunnel Termination Gateway 104 when the Received L2 Packet 301 is received through Private Networks 104. Received L2 Packet 301 received by Tunnel Terminal Gateway 104 is a Gateway Layer Two Packet, which encapsulates Internet Packet. Internet Packet is a layer three packet received by Gateway 106 and intended to be sent to one of or all computing devices 111-114. CSL2 Packet 302 is encapsulated in Tunnel Layer Three Packet 304 and same as Gateway Layer Two Packet. Tunnel Termination Gateway 104 sends Tunnel Layer Three Packet 304 to one of the AP if the transmission type is unicast or to all AP if the transmission type is broadcast or multicast.

The fourth scenario is that the Received L2 Packet is received through private network 105 with a non-pre-defined layer two broadcast or multicast destination. According to one of the embodiments of present invention, as the destination address of Received L2 Packet is not a pre-defined layer two broadcast or multicast destination, Tunnel Termination Gateway 104 determines that the Received L2 Packet is intended for unicast to a specific layer two address belonging to one of computing devices 111-114 reachable through Internet 103. Therefore, Tunnel Termination Gateway decides that a CSL2 Packet is to be sent with unicast transmission type through Internet 103 at step 202 and the destination address is a specific layer two address at step 204 of one of computing devices 111-114 and AP 101-102. The CSL2 Packet is determined to be encapsulated in one or more layer three packets at step 205 and the one or more layer three packets, which are the same as Tunnelled Layer Three Packets, are sent at step 207.

It should be noted that when the Received L2 Packet is received from Gateway 104, Received L2 Packet may have already encapsulated Internet Packets. In such case, Received L2 Packet is the same as Gateway Layer Two Packet and Tunnelled Layer Three Packet encapsulates CSL2 Packet.

The fifth scenario is that the Received L2 Packet is received by AP 101 from a directly connected host, such as computing device 113, with a pre-defined layer two broadcast or multicast destination address. According to one of the embodiments of present invention, as the destination address of Received L2 Packet is a pre-defined broadcast or multicast destination address. AP 101 is able to determine that the Received L2 Packet is intended for broadcast or multicast respectively. Therefore, it is decided that a CSL2 Packet is sent to Tunnel Termination Gateway 104 with broadcast or multicast transmission type at step 202 and the destination address may be a broadcast layer two address or the layer two address of Tunnel Termination Gateway 104 at step 204. As the Tunnel Termination Gateway 104 is only reachable through Internet 103, AP 102 has to send the CSL2 Packet through Internet 103. AP 102 at step 205 and step 207 encapsulates and sends the CSL2 Packet in one or more layer three packets, which are AP Layer Three Packet, to Tunnel Termination Gateway 104 through Internet 103 using the layer three address of Tunnel Termination Gateway 104.

Figure 3C:
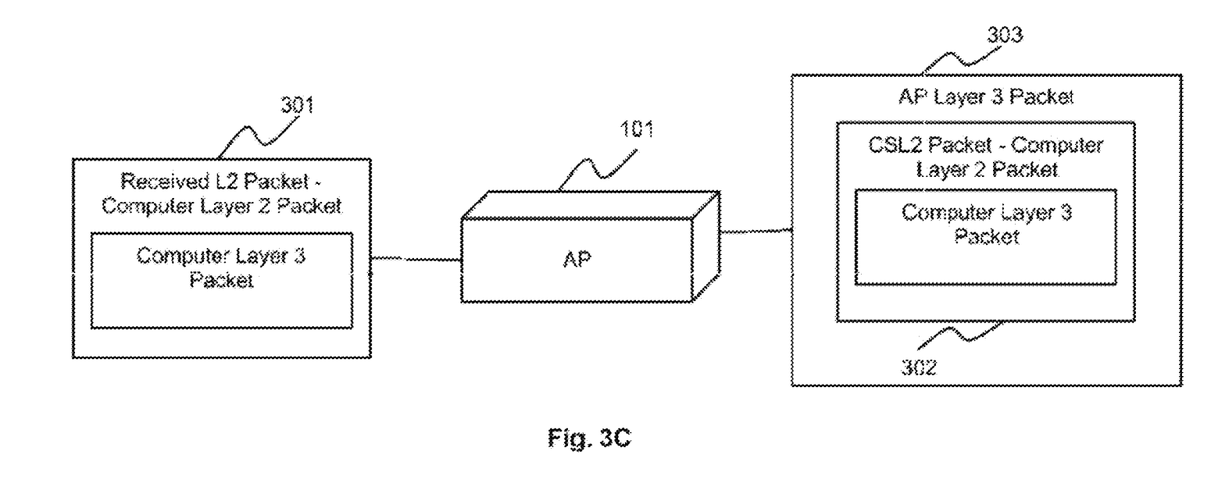
FIG. 3C illustrates the relationship among level 2 and level 3 packets received and sent by an AP when the Received L2 Packet 301 is received from one of the computing devices 111-114.

FIG. 3C illustrates the relationship among level 2 and level 3 packets received and sent by an AP when the Received L2 Packet 301 is received from one of the computing devices 111-114. Received L2 Packet 301 received by the AP is a Computer Layer Three Packet. The AP retrieves the Computer Layer Three Packet from Received L2 Packet 301 and encapsulates the Computer Layer Three Packet in CSL2 Packet 302, which is encapsulated in AP Layer Three Packet 303. The AP then sends AP Layer Three Packet 303 to Tunnel Termination Gateway 104.

The port number of AP Layer Three Packet may be set to a pre-defined port number to inform Tunnel Termination Gateway 104 that the AP Layer Three Packet encapsulates a CSL2 Packet intended for broadcasting. Depending on the preferences of the manufacturer and/or the administrator of AP 101, AP 101 may or may not broadcast the Received L2 Packet to other hosts directly connected. If AP 101 does not broadcast the CSL2 Packet to other hosts directly connected, network packets may be reduced. If AP 101 decides to broadcast the CSL2 Packet to other hosts directly connected at step 205, the CSL2 Packet is then sent to the hosts at step 207.

The sixth scenario is that the Received L2 Packet is received by AP 101 from a directly connected host, such as computing device 111, with a non-pre-defined layer two broadcast or multicast destination address. According to one of the embodiments of present invention, as the destination address of Received L2 Packet is not a predefined broadcast destination address, AP 101 may determine that the Received L2 Packet is intended for unicast to a specific layer two address, which may belong to another device directly, connecting to AP 101, such as computing device 112 or another device in the same layer two network reachable through Internet 103. Therefore, AP 101 decides that a CSL2 Packet is to be sent at step 202 and also decides that the transmission type is unicast at step 204. The layer two destination address of the CSL2 Packet is the destination address of the Received L2 Packet. If AP 101 may send the destination address of the CSL2 Packet without passing through Internet 103, such as computing device 112, AP 101 may send the CSL2 Packet to computing device 112 with layer three encapsulation. If AP 101 has to send the CSL2 Packet through Internet 103, AP 101 at step 205 and step 207 encapsulates and sends the CSL2 Packet in one or more layer three packets, which are AP Layer Three Packets, to Tunnel Termination Gateway 104 through Internet 103 using the layer three address of Tunnel Termination Gateway 104.

The seventh scenario is that the Received L2 Packet is received by AP 101 through Internet 103 with a pre-defined layer two broadcast destination address. Using FIG. 1 for illustrative purpose, when the destination address of Received L2 Packet is a predefined broadcast destination address, the Received L2 Packet is intended for broadcasting to computing devices 111 and 112. Depending on the preferences of the manufacturer and/or the administrator of AP 101, AP 101 may or may not broadcast the Received L2 Packet to other computing devices 111 and 112 at step 202. If AP 101 does not broadcast the CSL2 Packet to hosts directly connected, network packets may be reduced and the process stops at step 203. If AP 101 decides to broadcast the CSL2 Packet to other hosts directly connected at step 202, the destination address of CSL2 Packet is the pre-defined layer two broadcast destination, such as MAC Address FF:FF:FF:FF:FF:FF in Ethernet at step 204. As computing devices 111 and 112 are in the same layer two network, there is no layer three encapsulation at step 205 and the CSL2 Packet is sent at step 206.

Figure 3D:
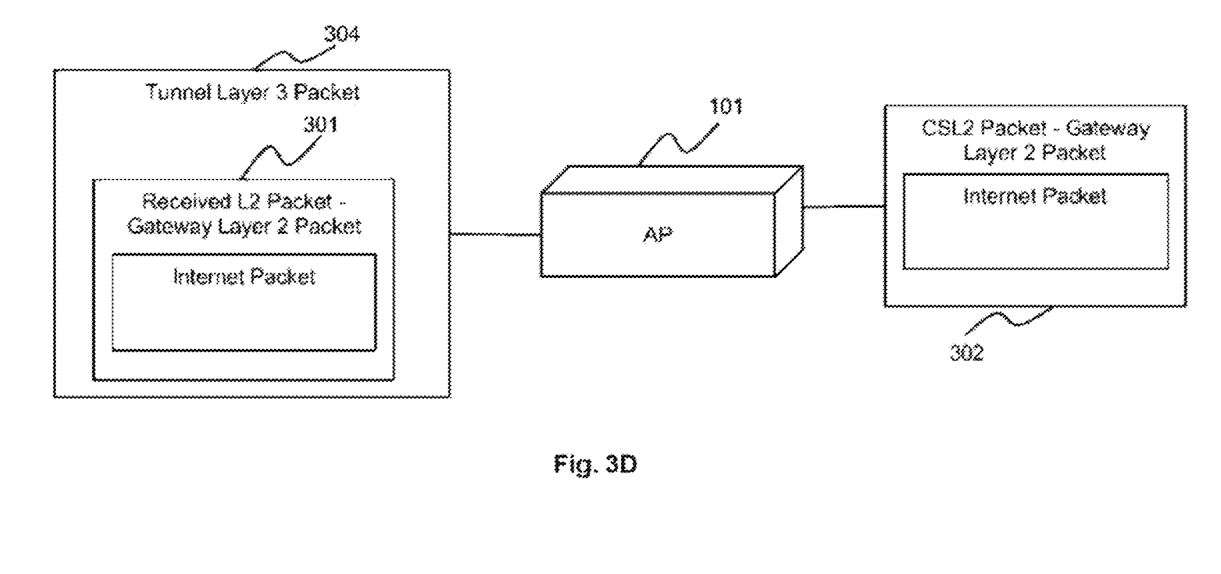
FIG. 3D illustrates the relationship among level 2 and level 3 packets received and sent by an AP when the Received L2 Packet 301 is sent by Tunnel Termination Gateway 104 and received by one of AP 101 or 102.

FIG. 3D illustrates the relationship among level 2 and level 3 packets received and sent by an AP when the Received L2 Packet 301 is sent by Tunnel Termination Gateway 104 and received by one of AP 101 or 102. Here, the Received L2 Packet 301 is a Gateway Layer Two Packet, which encapsulates Internet Packet and is encapsulated in Tunnel Layer Three Packets 304. The AP decapsulates Tunnel Layer Three Packet 304 to retrieve Gateway Layer Two Packet. Using FIG. 1 for illustrative purpose, the AP sends CSL2 Packet 302, which is the Gateway Layer Two Packet, to one of the computing devices 111-114 if the transmission type is unicast or to all computing devices 111-114 if the transmission type is broadcast.

The eighth scenario is that the Received L2 Packet is received by AP 101 through Internet 103 with a non-pre-defined layer two broadcast destination address. According to one of the embodiments of present invention, as the destination address of Received L2 Packet is not a pre-defined broadcast destination address, the Received L2 Packet is intended for unicast to a specific computing device directly connected, such as one of computing devices 111 and 112. Therefore, AP 101 decides that a CSL2 Packet is to be sent at step 202 and also decides that the transmission type is unicast at step 204. The layer two destination address of the CSL2 Packet is the destination address of the Received L2 Packet. AP 101 sends the CSL2 Packet to either computing device 111 or 112 at step 206 without layer three encapsulation at step 205. As the Received L2 Packet is received through Internet 103, it is encapsulated in one or more layer three packets, which are Tunnel Layer Three Packets originated from Tunnel Termination Gateway 104. AP 101 has to decapsulate Tunnel Layer Three Packets in order to retrieve the Received L2 Packet.

It should be noted that the payload contained in Received L2 Packet should be the same as the payload contained in CSL2 Packet but the layer two destination address of Received L2 Packet may be different from of CSL2 Packet. This is because the CS, which may be an AP or Tunnel Termination Gateway, may change the layer two destination address in order to convert a layer two broadcast or multicast destination address to a layer two unicast destination address.

According to one of the embodiments of present invention, instead of relying on the layer two destination address of the Received L2 Packet or relying on port number of the layer three packets encapsulating the Received L2 Packet to determine whether the Received L2 Packet is intended for broadcast or multicast, the CS examines the information stored in the payload of the Received L2 Packet in order to make the decision.

According to one of the embodiments of present invention, the Received L2 Packet encapsulates an IP Address Resolution Protocol (ARP) packet, which may be a probe, announcement or reply packet. If the ARP packet is a probe or announcement packet, the transmission type of the Received L2 Packet is broadcast or multicast. Then depending on the origin of the Received L2 Packet, such as from private networks 105 or from one of the computing devices 111-114, the CS, such as AP 101, AP 102 or Tunnel Termination Gateway 104 may determine whether to broadcast or multicast a corresponding CSL2 Packet. It is apparent to a skilled person in the art how to recognize if the Received L2 Packet encapsulates an IP ARP packet and the type of ARP packet.

According to one of the embodiments of present invention, when Received L2 Packet is an ARP reply packet, the CS, such as AP 101, AP 102 or Tunnel Termination Gateway 104, caches the IP address and MAC address pair of the ARP reply packet. The transmission type of the Received L2 Packet may be unicast or broadcast. When the CS receives another Received L2 Packet, which may be unicast, broadcast or multicast, containing an ARP probe packet later, CS then responds to the sender of the ARP probe packet by sending a CSL2 Packet with the cached IP address and MAC address pair. Therefore, the CS is acting like an ARP cache. It is apparent to a skilled person in the art how to implement an ARP cache. A computer storage medium may be used as a cache for storing the cached IP address and MAC address pair.

According to one of the embodiments of present invention the Received L2 Packet encapsulates an IP Dynamic Host Configuration Protocol (DHCP) packet, which may be a discovery, offer, request, acknowledgement, information or releasing packet. If the DHCP packet is a discovery or request packet, the transmission type of the packet is broadcast. Then, depending on the origin of the Received L2 Packet, such as from private networks 105 or from one of the computing devices 111-114, the CS, such as Tunnel Termination Gateway 104, AP 101 or AP 102, then determines whether to broadcast or multicast a corresponding CSL2 Packet. It is apparent to a skilled person in the art how to recognize if the Received L2 Packet encapsulates an IP DHCP packet and the type of DHCP packet.

According to one of the embodiments of present invention, when transmission type of Received L2 Packet is broadcast or multicast and transmission type of CSL2 Packet is unicast, the layer two destination address in the case of Ethernet is changed from broadcast address FF:FF:FF:FF:FF:FF or a multicast address to a layer two unicast address. However, if the CS is an AP, such as one of AP 101-102, the AP needs to learn the layer two destination address, which is the layer two address of Tunnel Termination Gateway 104. The layer two address of Tunnel Termination Gateway 104 may be inputted by network administrator, received by querying another communication system whose address is pre-configured, or by learnt from the response after sending a pre-defined layer three packet. If a pre-defined layer three packet is used, AP may then learn the destination address from the reply of the pre-defined layer three packet.

According to one of the embodiments of present invention, layer three packets exchanged between Tunnel Termination Gateway 104 and APs are used to determine the destination address of CSL2 Packet when the transmission type of Received L2 Packet is broadcast or multicast. An AP and Tunnel Termination Gateway 104 both listen to the same specific User Data Protocol (UDP) port. The AP first sends a UDP packet to the specific UDP port of the Tunnel Termination Gateway 104, whose IP address is learnt by the AP from DHCP packets or pre-determined configuration. Tunnel Termination Gateway 104 intercepts any UDP packets arriving at the specific UDP port and checks the payload of the UDP packets. If the payload matches a predefined format or content, Tunnel Termination Gateway 104 is then able to recognize the layer two address of the AP, and may send a second UDP packet to the same specific UDP port of AP for confirmation. When AP received the second UDP packet, it also verifies whether the payload of the second UDP packet matches a pre-defined format or content and, if so, the AP stores the layer two source address of the second UDP packet, such as the MAC address of the second UDP packet. From then on, until further reset or change of network conditions, AP sets the destination address of CSL2 packet to the layer two source address of the second UDP packet when the transmission type of Received L2 Packet is broadcast or multicast.

According to one of the embodiments of present invention, the communication system, such as AP 101, AP 102 and Tunnel Termination Gateway 104 may be composed of two communication systems. The first communication system is responsible for establishing layer two tunnels by using layer three communication technologies, such as a L2TP network server. The second communication system is responsible for determine whether to send CSL2 packet, the transmission type of the CSL2 packets and the destination address of CSL2 packets.

Communication System

Figure 4:
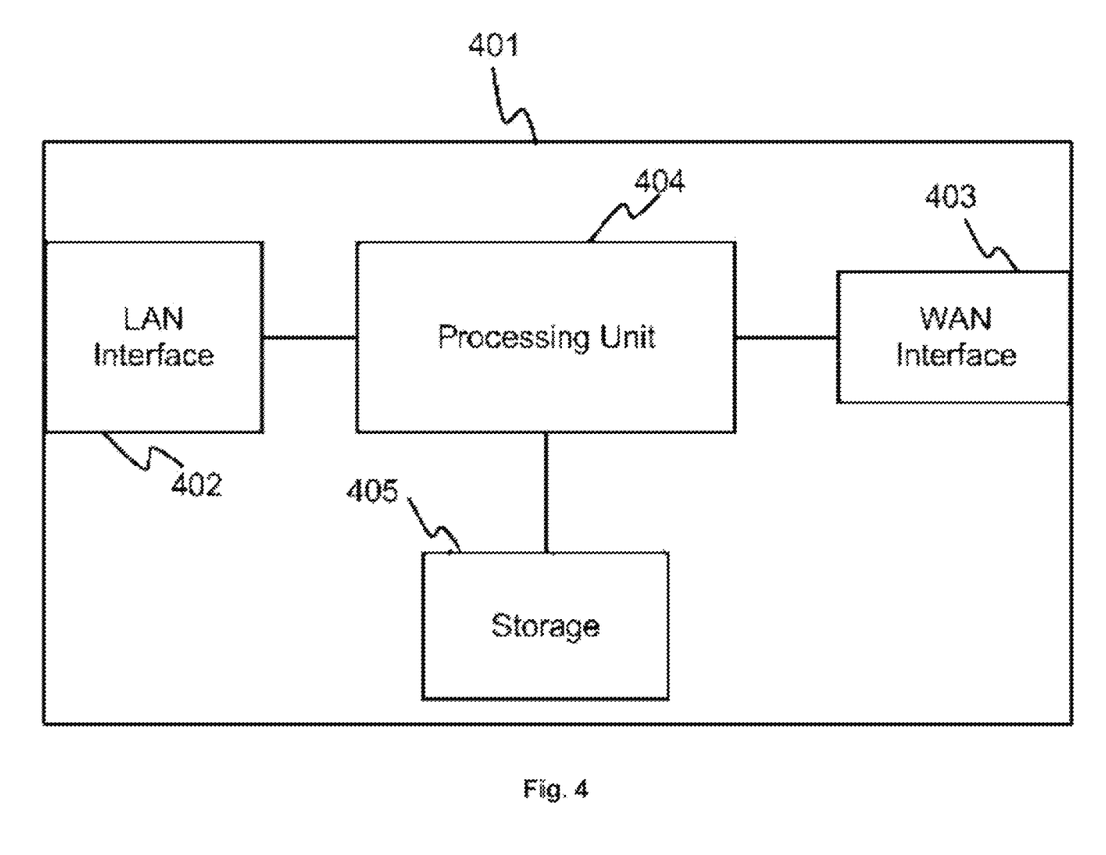
FIG. 4 illustrates one of the embodiments of present invention of a communication system according to the present invention described.

FIG. 4 illustrates one of the embodiments of present invention of a communication system according to the present invention described. The communication system 401 comprises a processor unit(s) 402, a data storage 405, at least one LAN interface 402, and at least one WAN interface 403, for use with other network apparatus such as WiMAX routers, Ethernet switches, IP routers and other packet network devices, network management and provisioning systems, local PCs, etc. Processor unit(s) 402 couples to data storage 405, LAN interface 402, and WAN interface 403 respectively. Other components which may be utilized within the network device 401 include amplifiers, board level electronic components, as well as media processors and other specialized SoC or ASIC devices. Support for various processing layers and protocols (e.g., 802.3, DOCSIS MAC, DHCP, SNMP, H.323/RTP/RTCP, VoIP, SIP, etc.) may also be provided as required.

Communication system 401 may take any number of physical forms, comprising for example one of a plurality of discrete modules or cards within a larger network edge or hub device of the type well known in the art and may also comprise firmware, either alone or in combination with other hardware/software components. Alternatively, Communication system 401 may be a stand-alone device or module disposed at other computing device or network device, and may even include its own RF front end (e.g., modulators, encryptors, etc.) or optical interface so as to interface directly with other computing devices and network devices. Numerous other configurations may be used. Communication system 401 may also be integrated with other types of components (such as mobile base stations, satellite transceivers, video set-top box, encoders/decoders, etc.) and form factors if desired.

Processing unit 404 may be implemented by using one or more central processing units, network processors, microprocessors, micro-controllers, FPGAs, ASICs or any device capable of performing instructions to perform the basic arithmetical, logical, and input/output operations of the system.

Computer storage medium 405 may be implemented by using at least one DRAM, SDRAM, Flash RAM, optical memory, magnetic memory, hard disk, and/or any computer readable media that are able to provide data storage capability. Computer storage medium 405 may be used to provide instructions to processing units 402 and to provide data storage to store cache, identifiers, conditions, thresholds, network performance statistics, web pages, messages and other data to facilitate the operation of the communication system 401.

When communication system 401 receives a Received L2 Packet through a network connection in either LAN interface 402 or WAN interface 403, processing unit 404 determines whether transmission type of the Received L2 Packet is broadcast, multicast or unicast. The network connection may be implemented by different network connection technologies, including wireless, wire and optical fiber. According to one of the embodiments of present invention, the processing unit 404 determines the transmission type by checking the destination address of the Received L2 Packet. As it is possible that the Received L2 Packet is encapsulated in one or more Received L3 Packets, processing unit 404 may need to decapsulate the Received L3 Packet to retrieve Received L2 Packet. Hosts communicating by using IP may use IGMP to determine the multicast address.

Processing unit 404 determines whether to send a CSL2 Packet. If processing unit 404 determines to send a CSL2 packet, the CLS2 packet is sent through WAN interface 403 if the Received L2 Packet is received from LAN interface 402. On the other hand, if processing unit 404 determines to send a CSL2 packet, the CLS2 packet is sent through LAN interface 402 if the Received L2 Packet is received from WAN interface 403. CSL2 According to one of the embodiments of present invention, processing unit 404 decides to send CSL2 Packet if transmission type of Received L2 Packet is unicast. According to one of the embodiments of present invention, processing unit 404 decides not to send CSL2 Packet if transmission type of Received L2 Packet is broadcast or multicast. According to one of the embodiments of present invention, processing unit 404 decides to send a broadcast or multicast CSL2 Packet if transmission type of Received L2 Packet is unicast and the destination address of the Received L2 Packet is a pre-determined address. According to one of the embodiments of present invention, processing unit 404 decides to send a broadcast CSL2 Packet if transmission type of Received L2 Packet is unicast and the Received L3 Packets is received at a pre defined port. According to one of the embodiments of present invention, the decision whether to send CSL2 Packet is based on one or more Predefined Rules.

Computer storage medium 405 may be used to store the content carried by Received L2 Packet. In one variant, once the corresponding CSL2 Packet is sent, the content carried by the Received L2 packet that is stored in computer storage medium 405 is then removed in order to release data storage space.

The destination address of CSL2 Packet is determined by processing unit 404. According to one of the embodiments of present invention, the destination address is determined by process unit 404 according to Pre-defined Rules. The Pre-defined Rules are stored in computer storage medium 405.

Referring to the eight scenarios described earlier, processing unit 404 of a communication system, such as Tunnel Termination Gateway 104, AP 101 and AP 102 performs the function of determining whether a Received L2 Packet is intended for broadcast, multicast or unicast, determining the transmission type of a CSL2 Packet, the destination address of the CSL2 Packet, establishing VPN, terminating VPN, encapsulating a layer two packets in at least one layer three packet, decapsulating a layer two packet from at least one layer three packet, and other processing functions.

According to one of the embodiments of present invention, the communication system, such as AP 101, AP 102 and Tunnel Termination Gateway 104 may be composed of at least one layer three router and at least one layer two switch. The at least one layer three router is responsible for establishing layer two tunnels by using layer three communication technologies, such as a L2TP network server. The at least one layer two switch is responsible for determining whether to send CSL2 packet, the transmission type of the CSL2 packets and the destination address of CSL2 packets. Each of the layer three router and layer two switch has its own processing unit, computer storage medium, LAN interface, WAN interface to carry out the functions of communication system 401. The at least one layer three router is used to connect to an external network, such as interconnected network or the Internet. The LAN interface of the at least one layer three router is connected to one of the ports of the at least one layer two switch. Another one of the ports of the at least one layer two switch is connected to the private network. It is apparent to a skilled person in the art how to implement at least one layer three router and at least one layer two switch for carrying out the functions of communication system 401.

According to one of the embodiments of present invention, at least one LAN interface of communication system 401 is an 802.11 interface that allows hosts to connect to the communications system using IEEE 802.11 protocol, including 802.11a, 802.11b, 802.11g, 802.11n, 802.11ac, and 802.11ad; at least one WAN interface is an 802.16 interface that allows communication system 401 to connect to inter-network or the Internet through IEEE 802.16 protocol. In one variant, the WiMAX modem is embedded inside communication system 401 and therefore WAN interface may directly connect with an antenna. In one variant, an IEEE 802.11 modem is embedded inside communication system 401 and therefore LAN interface may directly connect with at least one antenna. In one variant, the IEEE 802.16 modem is embedded inside communication system 401 and therefore WAN interface may directly connect with at least one antenna.

The invention claimed is:

1. A method for processing a first layer two packet bar converting a first layer two packet into a first unicast layer two packet at a wireless access point, comprising:
 (a) receiving first one or more layer three packets;
 (b) extracting the first layer two packet from the first one or more layer three packets;
 (c) determining whether the first layer two layer packet is a multicast packet;
 (d) when the first layer two packet is determined to be the multicast packet:
  (i) determining whether the first layer two packet satisfies one of predefined rules; wherein at least one predefined rule is based on whether a destination address of the first layer two packet is a predefined broadcast destination address; and wherein the predefined rules are determined based on an origin of the first layer two packet;
  (ii) when the first layer two packet satisfies one of the predefined rules: converting the first layer two packet into a layer two unicast packet with a first destination address; and sending the first layer two packet with the first destination address to a local area network (LAN) network interface; wherein the first destination address is learned by the wireless access point by one of: (A) receiving the first destination address as input by a network administrator, (B) receiving the first destination address by querying another communication system whose address is pre-configured, or (C) receiving the first destination address in a response after sending a predefined layer three packet;
  (iii) when the first layer two packet does not satisfy any predefined rules, and when payload of the first layer two packet matches a predefined format or content: broadcasting the first layer two packet to one or more LAN network interfaces; and
  (iv) when a multicast address is not a predefined broadcast or multicast address: converting the broadcast or multicast address into a first unicast address; and sending the first layer two packet to the first unicast address through a second network interface according to predefined rules; wherein the first unicast address is determined by: (1) listening to a specific User Data Protocol (UDP) port; (2) sending a first UDP packet with a predefined content to the specific UDP port of a second communication system, wherein IP address of the second communication system is determined using Dynamic Host Configuration Protocol (DHCP) or predetermined configuration; (3) receiving a second UDP packet from the second communication system; (4) if content of the second UDP packet matches a predefined content, storing a layer two source address of the second UDP packet; and
  (5) determining the unicast address to be the same as the layer two source address of the second UDP packet; and
 (e) when the first layer two packet is not a multicast packet, sending the first layer two packet to its corresponding destination address through one or more LAN networks.

2. The method of claim 1, wherein when the first layer two packet satisfies a first predefined rule, not sending the first layer two packet.

3. The method of claim 1, wherein the first one or more layer three packets are received through a virtual private network (VPN).

4. The method of claim 1, wherein the first one or more layer three packets are received from a first wide area network (WAN) network interface.

5. The method of claim 1, wherein the first destination address is determined according to the one of predefined formats.

6. The method of claim 1, wherein the predefined rules are created by a manufacturer of the wireless access point, inputted manually, and retrieved from a server either locally or remotely.

7. The method of claim 1, wherein the first layer two packet encapsulates an Internet Protocol (IP) Address Resolution Protocol (ARP) packet.

8. The method of claim 1, wherein the first layer two packet encapsulates an IP Dynamic Host Configuration Protocol (DHCP) packet.

9. The method of claim 1, wherein the determining whether the first layer two packet is a multicast packet is based on destination address of the multicast packet.

10. The method of claim 1, wherein the first one or more layer three packets is received by using User Data Protocol (UDP).

11. A wireless access point for processing a first layer two packet by converting a first layer two packet into a first unicast layer two packet comprising at least two network interfaces, at least one processing circuit, and a non-transitory computer readable storage medium comprising program instructions executable by the at least one processing circuit to perform an operation of:
 (a) receiving first one or more layer three packets;
 (b) extracting a first layer two packet from the first one or more layer three packets;
 (c) determining whether the first layer two layer is a multicast packet;
 (d) when the first layer two packet is determined to be the multicast packet
  (i) determining whether the first layer two packet satisfies one of predefined rules; wherein at least one predefined rule is based on whether a destination address of the first layer two packet is a predefined broadcast destination address; and wherein the predefined rules are determined based on an origin of the first layer two packet;
  (ii) when the first layer two packet satisfies one of the predefined rules: converting the first layer two packet into a layer two unicast packet with a first destination address; and sending the first layer two packet with the first destination address to a local area network (LAN) network interface; wherein the first destination address is learned by the wireless access point by one of: (A) receiving the first destination address as input by a network administrator, (B) receiving the first destination address by querying another communication system whose address is pre-configured, or (C) receiving the first destination address in a response after sending a predefined layer three packet;

(iii) when the first layer two packet does not satisfy any predefined rules, and when payload of the first layer two packet matches a predefined format or content: broadcasting the first layer two packet to one or more LAN network interfaces; and (iv) when a multicast address is not a predefined broadcast or multicast address: converting the broadcast or multicast address into a first unicast address; and sending the first layer two packet to the first unicast address through a second network interface according to predefined rules; wherein the first unicast address is determined by: (1) listening to a specific User Data Protocol (UDP) port; (2) sending a first UDP packet with a predefined content to the specific UDP port of a second communication system, wherein IP address of the second communication system is determined using Dynamic Host Configuration Protocol (DHCP) or predetermined configuration; (3) receiving a second UDP packet from the second communication system; (4) if content of the second UDP packet matches a predefined content, storing a layer two source address of the second UDP packet; and (5) determining the unicast address to be the same as the layer two source address of the second UDP packet;

(e) when the first layer two packet is not a multicast packet, sending the first layer two packet to its corresponding destination address through one or more LAN networks;

wherein the at least one processing unit is coupled to the at least two network interfaces and the computer storage medium.

12. The system of claim 11, wherein the non-transitory computer readable storage medium comprises program instructions executable by the at least one processing unit to further perform the operation of: when the first layer two packet satisfies a first predefined rule, not sending the first layer two packet.

13. The system of claim 11, wherein the first one or more layer three packets are received through a virtual private network (VPN).

14. The system of claim 11, wherein the first one or more layer three packets are received from a first wide area network (WAN) network interface.

15. The system of claim 11, wherein the first destination address is determined according to the one of the predefined formats.

16. The system of claim 11, wherein the predefined rules are created by a manufacturer of the wireless access point, inputted manually, and retrieved from a server either locally or remotely.

17. The system of claim 11, wherein the first layer two packet encapsulates an Internet Protocol (IP) Address Resolution Protocol (ARP) packet.

18. The system of claim 11, wherein the first layer two packet encapsulates an IP Dynamic Host Configuration Protocol (DHCP) packet.

19. The system of claim 11, wherein the determining whether the first layer two packet is a multicast packet is based on a destination address of the multicast packet.

20. The system of claim 11, wherein the first one or more layer three packets is received using User Data Protocol (UDP).

* * * * *